(12) United States Patent
Thorsted

(10) Patent No.: US 7,619,234 B2
(45) Date of Patent: Nov. 17, 2009

(54) ULTRAVIOLET MONITORING SYSTEM

(75) Inventor: Michael K. Thorsted, King George, VA (US)

(73) Assignee: Syntronics L.L.C., King George, VA (US)

( * ) Notice: Subject to any disclaimer, the term of this patent is extended or adjusted under 35 U.S.C. 154(b) by 303 days.

(21) Appl. No.: 11/723,544

(22) Filed: Mar. 20, 2007

(65) Prior Publication Data

US 2008/0231471 A1    Sep. 25, 2008

(51) Int. Cl.
*G08G 5/00* (2006.01)
(52) U.S. Cl. .............. 250/504 R; 250/493.1; 250/503.1; 250/491.1; 250/492.1; 340/945; 340/952; 340/500; 340/540; 340/600
(58) Field of Classification Search .............. 250/493.1, 250/503.1, 504 R, 491.1, 492.1; 340/945, 340/948, 952, 500, 540, 600
See application file for complete search history.

(56) References Cited

U.S. PATENT DOCUMENTS

| | | | | |
|---|---|---|---|---|
| 5,123,615 A | * | 6/1992 | Wagner et al. | 244/116 |
| 5,719,567 A | * | 2/1998 | Norris | 340/953 |
| 6,534,756 B1 | * | 3/2003 | Grimbergen | 250/205 |
| 2008/0169423 A1 | * | 7/2008 | Betschart et al. | 250/372 |

* cited by examiner

*Primary Examiner*—Nikita Wells
*Assistant Examiner*—Michael J Logie
(74) *Attorney, Agent, or Firm*—Finnegan, Henderson, Farabow, Garrett & Dunner

(57) ABSTRACT

An ultraviolet radiation emission unit includes a housing and an aperture located on the housing. A radiation source includes a light emitting diode configured to emit radiation having a wavelength within a range of about 240 nm and about 280 nm. A radiation reflector is disposed proximate to the radiation source and configured to direct the radiation emitted from the radiation source through the aperture in the housing.

22 Claims, 2 Drawing Sheets

ULTRAVIOLET MONITORING SYSTEM

TECHNICAL FIELD

The disclosed methods and systems relate generally to the field of radiation monitoring systems and, more particularly, to ultraviolet monitoring systems.

BACKGROUND

There is an ever increasing need for remote sensing and monitoring systems that can monitor the status of a selected area and communicate the status of the area to a user of the system, to a location remotely located with respect to the monitoring system, or to a recording device. Such systems may be associated with security systems intended, for example, to detect motion, the presence of an intruder, or other states associated with a monitored area.

As air travel increases, airports continue to become busier and experience higher traffic not only from airplanes, but also from various support vehicles on the ground. Airports include a runways, taxiways, service vehicle lanes, gate entrances, and various other pathways that experience vehicular and airplane travel. While operators of the vehicles and airplanes are trained in the protocols and rules of traveling over these airport pathways, and certain airports may include one or more tracking systems intended to aid in monitoring movement of airplanes and vehicles throughout the airport, collisions can still occur. Such collisions can be catastrophic in view of the highly flammable fuel present on aircraft and transported by fuel trucks. These collisions may also be costly not only in terms of equipment damage, but also in view of the costs incurred as a result of flight delays and reduced service capabilities.

There is a need for monitoring systems to monitor the movements of aircraft and other vehicles over the many travel pathways found at airports (especially those with significant commercial traffic). These monitoring systems may be used either as primary or redundant movement detection systems. By monitoring the position and movements of airport traffic, situations that may result in a collision may be recognized before the collisions occur. In response, one or more aircraft or vehicles may be instructed to slow, stop, or change heading to minimize or eliminate the risk of collision. The safety of passengers, pilots, crew, and airport employees may be significantly increased by employing these types of monitoring and collision avoidance systems.

The performance characteristics of monitoring systems, especially those operating in airports or other outdoor environments, should not be dependent on environmental conditions. In fact, the need for capable collision avoidance systems actually increases as visibility due to environmental conditions decreases. For example, in the presence of fog, rain, snow, smoke, or other atmospheric particulates, visibility at an airport can be significantly reduced. During these times of reduced visibility, pilots and airport personnel may rely even more heavily on a well-functioning collision avoidance system to minimize the risk of collision with unseen aircraft or vehicles.

Further, the performance of monitoring systems should be independent of the time of day. While there is little or no solar radiation present at night to interfere with monitoring system sensors and electronics, significant amounts of solar radiation may be present during daylight hours. This solar radiation can interfere with certain monitoring systems, especially those that are optically based.

The presently disclosed systems are directed toward meeting the needs and overcoming one or more of the problems described above.

SUMMARY OF THE INVENTION

One aspect of the disclosure includes an ultraviolet radiation emission unit having a housing and an aperture located on the housing. A radiation source includes a light emitting diode configured to emit radiation having a wavelength within a range of about 240 nm and about 280 nm. A radiation reflector is disposed proximate to the radiation source and configured to direct the radiation emitted from the radiation source through the aperture in the housing.

Another aspect of the disclosure includes an ultraviolet radiation emission unit that includes a housing and an aperture located on the housing. A radiation source has a lighted length of less than about 0.5 inches and is configured to emit radiation having a wavelength of between about 240 nm and about 280 nm. A radiation reflector is disposed proximate to the radiation source and configured to direct the radiation emitted from the radiation source through the aperture in the housing.

Another aspect of the disclosure includes an ultraviolet radiation detection unit having a housing and a radiation inlet aperture located on the housing. A first filter is positioned along an optical path extending from the radiation inlet aperture. The first filter has a primary passband with a center wavelength within the range of about 240 nm to about 280 nm and a secondary passband with a center wavelength greater than 300 nm. A second filter is positioned along the optical path, and the second filter has a primary passband with a center wavelength substantially the same as the center wavelength of the primary passband of the first filter and a secondary passband with a center wavelength different from the center wavelength of the secondary passband of the first filter. A sensor is configured to generate a signal indicative of at least one characteristic associated with radiation passing through the first and second filters.

Another aspect of the disclosure includes an ultraviolet monitoring system. The ultraviolet monitoring system includes an ultraviolet radiation emission unit having a housing and an aperture located on the housing. A radiation source is configured to emit radiation having a wavelength within a range of about 240 nm and about 280 nm. A radiation reflector is disposed proximate to the radiation source and is configured to direct the radiation emitted from the radiation source through the aperture in the housing of the emission unit. The ultraviolet monitoring system also includes an ultraviolet radiation detection unit remotely located with respect to the ultraviolet radiation emission unit. The ultraviolet radiation detection unit includes a housing and a radiation inlet aperture located on the housing. At least one filter is disposed in an optical path extending from the radiation inlet, and a sensor is configured to generate a signal indicative of at least one characteristic associated with radiation passing through the at least one filter.

DETAILED DESCRIPTION

Figure 1:
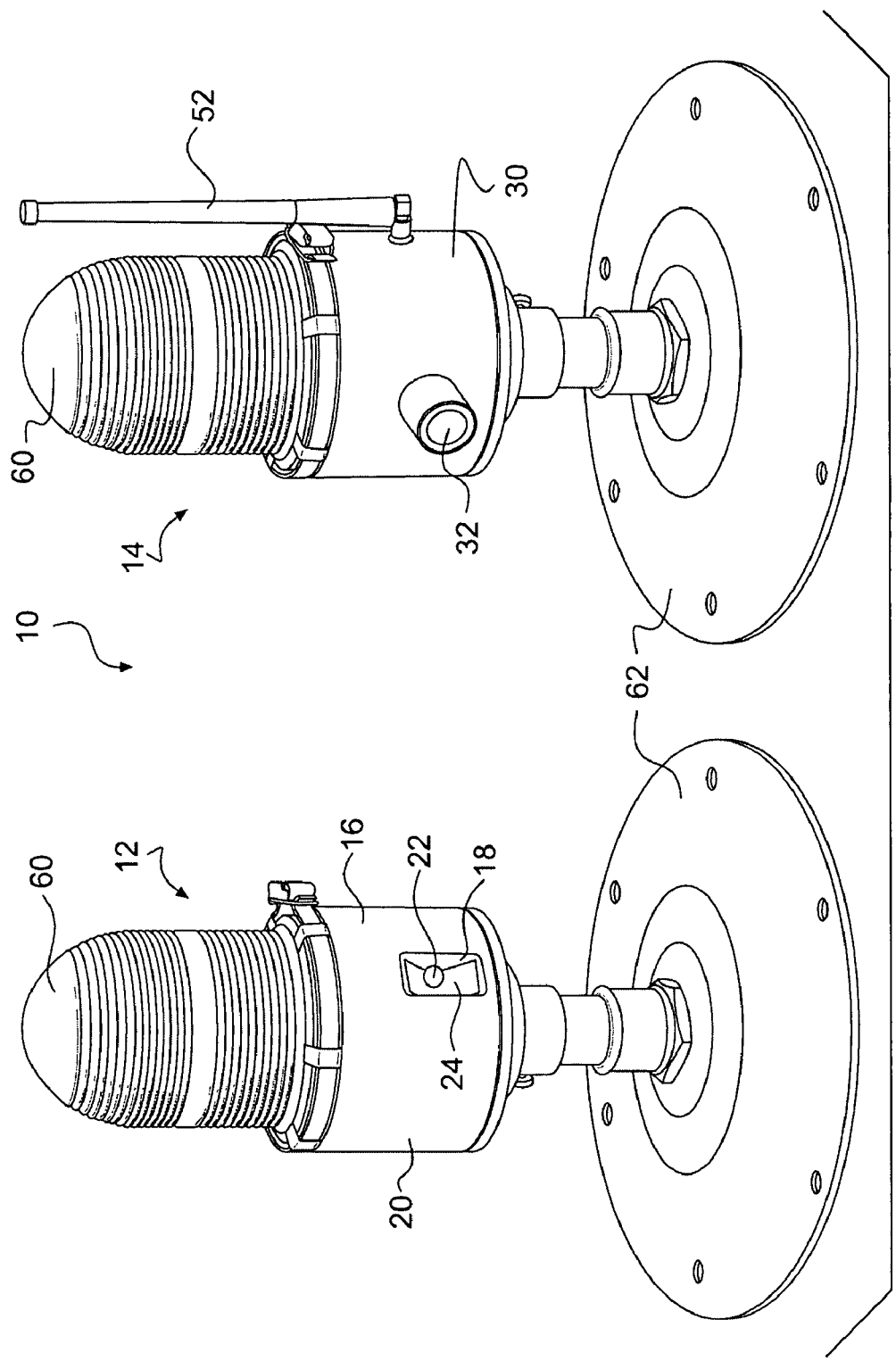
FIG. 1 provides a perspective view of an ultraviolet monitoring system, including an emission unit and a detection unit, according to an exemplary disclosed embodiment.

FIG. 1 provides a perspective view of an ultraviolet monitoring system 10, according to an exemplary disclosed embodiment. Monitoring system 10 may include an ultraviolet radiation emission unit 12 and an ultraviolet radiation detection unit 14. In monitoring system 10, emission unit 12 and detection unit 14 may be arranged in pairs such that radiation emitted from an emission unit 12 can be detected by a corresponding detection unit 14. While monitoring system 10 can include just a single pair of emission and detection units, monitoring system 10 may be configured to include any number of pairs of emission and detection units.

Emission unit 12 may include a housing 16 and an aperture 18 disposed on housing 16. Housing 16 may be fabricated from any suitable material depending on a particular application for emission unit 12. For example, housing 16 may be fabricated from a polymer or from various metals, such as aluminum or steel. Housing 16 may also be fabricated in various shapes or configurations. In an exemplary embodiment, as illustrated in FIG. 1, housing 16 may include a body portion 20 configured substantially as a cylinder. Body portion 20 may be sized to house various electronics, power supplies, sensors, transmitters, or any other desired devices. In one embodiment, body portion 20 may have a diameter of about four inches.

Aperture 18 may be located on housing 16 at any desired location suitable for providing a radiation outlet from emission unit 12. In one embodiment, aperture 18 may be located through an outer wall of body portion 20.

A radiation source 22 may be included in emission unit 12 and positioned such that radiation emitted from source 22 leaves emission unit 12 through aperture 18. Radiation source 22 may be configured to emit radiation at any desired wavelength. In one embodiment, radiation source 22 emits ultraviolet radiation at a wavelength from within a range of about 240 nm to about 280 nm. This wavelength range corresponds to the solar blind region where interference from solar radiation is minimal or nonexistent due to atmospheric absorption of the solar radiation in this wavelength range. In another embodiment, radiation source 22 may be configured to emit ultraviolet radiation at a wavelength selected from a more narrow range of about 252 nm to about 255 nm. For example, radiation source 22 may be configured to emit ultraviolet radiation at a wavelength of about 253 nm.

Radiation source 22 can include any type of light source capable of emitting radiation in the ultraviolet wavelength range. For example, radiation source 22 may include an incandescent lamp, a mercury lamp, xenon lamp, or a deuterium lamp, and may include cold or hot cathode lamps. Radiation source 22 may also include a laser, such as a frequency quadrupled YAG laser.

In one embodiment, radiation source 22 may include a light emitting diode (LED) that emits radiation at a wavelength within the ultraviolet range. Ultraviolet LEDs are flexible in that they can be manufactured to emit radiation at a particular, desired wavelength (e.g., 253 nm) and have very little or no light emitted outside of a narrow band centered about the desired wavelength. These devices also require relatively low power for operation, and because they can be turned on and off rapidly, ultraviolet LEDs can be operated to emit radiation in pulses encrypted with data. Such a capability may be useful, for example, for transmitting information, such as a unique identifier of the radiation source, to a radiation detection unit.

In certain embodiments, radiation source 22 may be configured to include a lighted length that is shorter than the lighted lengths of traditional ultraviolet emission devices of detection and monitoring equipment. For example, radiation source 22 may have a lighted length of less than about 0.5 inches. More particularly, radiation source 22 may have a lighted length of less than about 0.375 inches. The short lighted length of radiation source 22 may offer several potential benefits. For example, radiation source 22 may require significantly smaller packaging than traditional units, and less power may be required to operate radiation source 22.

Emission unit 12 may also include a reflector 24 configured to direct radiation from radiation source 22 through aperture 18. For example, reflector 24 may be configured to have a convex shape, and source 22 may be located in front of reflector 24 such that light directed toward reflector 24 is reflected and redirected toward aperture 18. Reflector 24 can be sized and shaped according to the requirements of a specific application. In certain embodiments, reflector 24 may be approximately two inches along a major dimension.

A quartz window may be disposed over aperture 18 such that radiation emitted from radiation source 22 exits the aperture through the quartz window. The quartz window is transmissive to ultraviolet radiation and can protect radiation source 22 and other internal components of ultraviolet emission unit 12 from environmental elements outside of housing 16.

Monitoring system 10 also includes at least one ultraviolet detection unit 14, which is remotely located with respect to a corresponding ultraviolet radiation emission unit 12. Detection unit 14 includes a housing 30 and a radiation inlet aperture 32 located on housing 30.

Figure 2:
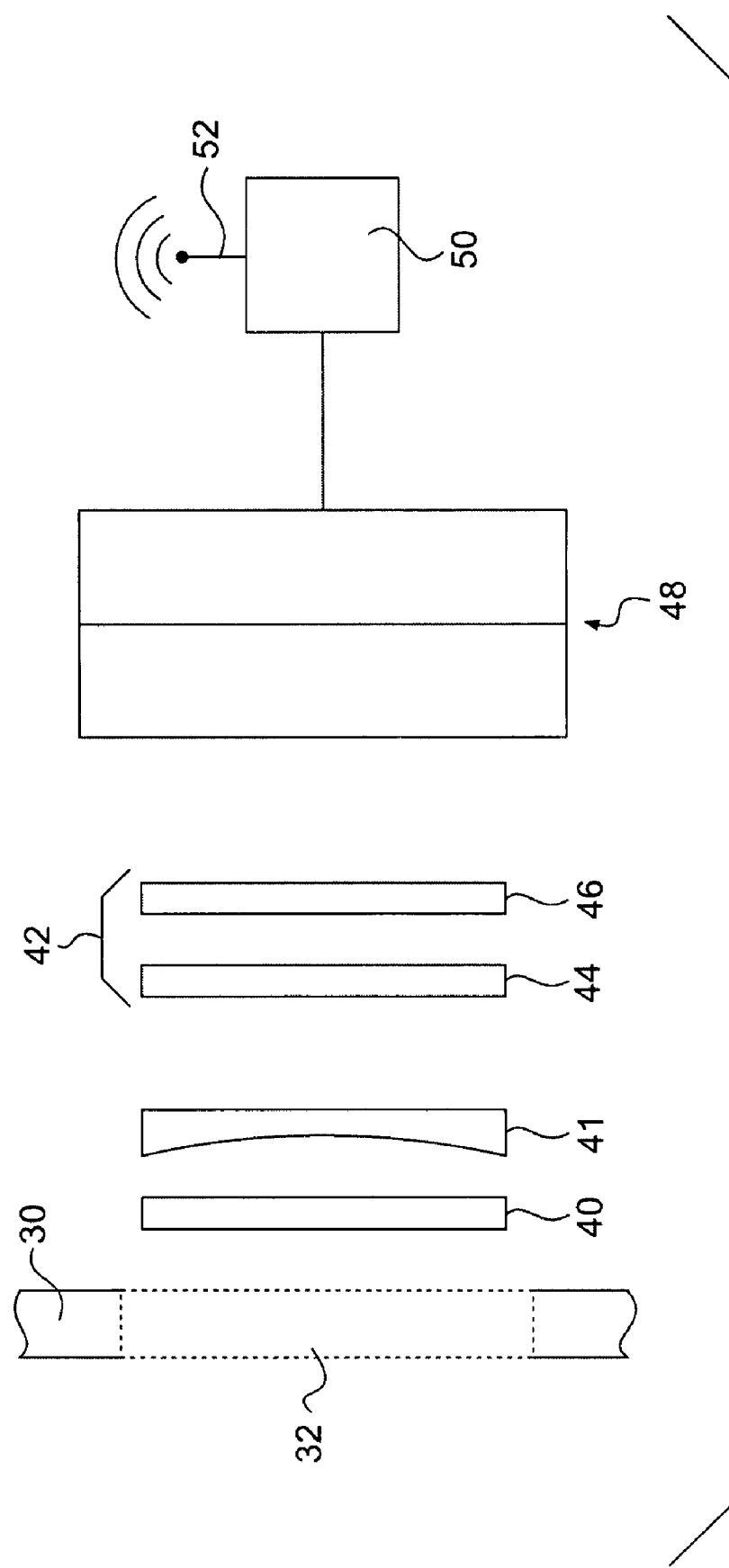
FIG. 2 provides a schematic representation of a filtering arrangement for an ultraviolet radiation detection unit, according to an exemplary disclosed embodiment.

FIG. 2 provides a schematic representation of certain optical components included in radiation detection unit 14. The components illustrated in FIG. 2 are exemplary only, and it should be understood that more or less optical components may be included in radiation detection unit 14. As in emission unit 12, a quartz window 40 may be included over inlet aperture 32 of detection unit 14. Quartz window 40 of the detection unit 14 is transmissive to ultraviolet radiation received, for example, from a corresponding emission unit 12. Further, an anti-reflective coating may be included on quartz window 40.

Radiation detection unit 14 may include a lens 41 for collimating radiation incident on inlet aperture 32. Lens 41 may be made from ultraviolet transmissive quartz or other materials transmissive to ultraviolet radiation. Lens 41 may be sized according to a particular sensor size and/or a desired focal length. In one embodiment, lens 41 may have a diameter of about 0.5 inches. Lens 41 may also include an anti-reflective coating.

Radiation detection unit 14 may also include a filter system 42 with at least one filter disposed in an optical path extending from radiation inlet 32. Particularly, a first filter 44 and a second filter 46 may be included in filter system 42. Additional filters may optionally be included in filter system 42, and the order of first filter 44 and second filter 46 may be reversed.

Both first filter 44 and second filter 46 may be positioned along an optical path extending from radiation inlet aperture 32, and both filters may be configured as bandpass filters that transmit radiation having wavelengths falling within a passband region and attenuate radiation falling outside of the passbands of the filter. First filter 44 may be configured with a primary passband having a center wavelength within the range of about 240 nm to about 280 nm. First filter 44 may also include a secondary passband having a center wavelength greater than 300 nm. In certain embodiments, the secondary passband of the first filter is located in the visible region.

Like first filter 44, second filter 46 may be configured with a primary passband having a center wavelength within the range of about 240 nm to about 280 nm. Second filter 46 may also include a secondary passband having a center wavelength greater than 300 nm. In certain embodiments, the secondary passband of the second filter is located in the visible region.

In one embodiment, the center wavelength of the primary passband of both the first and second filters is within a range of about 252 nm to about 255 nm. For example, both the first filter 44 and the second filter 46 may have a primary passband centered at 253 nm.

While the primary passband of both first filter 44 and second filter 46 may exhibit substantially the same center wavelength, the secondary passband of first filter 44 may be centered at a wavelength different from the center wavelength of the secondary passband of second filter 46. For example, the center wavelength of the secondary passband of the first filter may be at least 1.75 times greater than the center wavelength of the primary band of the first filter. The center wavelength of the secondary passband of the second filter is at least 1.25 times greater than the center wavelength of the primary band of the second filter.

Radiation detection unit 14 may include an ultraviolet sensor 48 configured to generate a signal indicative of at least one characteristic associated with radiation passing through the filter system 42. For example, sensor 48 may include a photocathode sensitive to radiation in the ultraviolet range. In one embodiment, sensor 48 may include a cesium tellurium (CsTe) photocathode sensitive over a wavelength range of about 150 nm to about 500 nm. Sensor 48 may also include various electronic components, including signal conditioners, amplifiers, etc. for generating and conditioning a signal output of sensor 48.

In one embodiment, sensor 48 may be configured to generate a signal indicative of the presence or absence of ultraviolet radiation passing through filter system 42. For example, if UV radiation is incident on sensor 48, sensor 48 may emit an output signal of predetermined amplitude. If no UV radiation is incident on sensor 48, then sensor 48 may emit an output signal having a second predetermined amplitude (e.g., 0V). Alternatively, sensor 48 may be configured to generate an output signal having an amplitude proportional to the intensity of UV radiation incident on sensor 48. In still another embodiment, sensor 48 may be associated with decoding electronics for interpreting data received as encrypted data pulses of UV radiation. In this embodiment, the output signal generated by sensor 48 may correspond to the data received by radiation detection unit 14.

The output signal generated by sensor 48 may be supplied, for example, to a transmitter 50. One or more processing units (not shown) may be associated with sensor 48 and/or transmitter 50 for further conditioning the signal generated by sensor 48. Transmitter 50 may be connected to an antenna 52 and may generate a radio frequency (RF) signal including information relating to the signal provided by sensor 48. While the present embodiment is described as including a capacity for radio frequency communication, any other suitable methods of relaying information from one location to another may be employed. For example, optical communication methods may be used that rely upon the transmission of information via infrared, ultraviolet, or other wavelengths of light. Further, information may be transferred over a wired connection, such as an RS-232 or RS-485 serial connection, for example.

Housing 16 and housing 30 may be configured according to the requirements of a particular application. In one embodiment, monitoring system 10 may be employed as part of a tracking and collision avoidance system at airports. In such an application, housing 16 and housing 30 may be configured for compatibility with airport fixtures located on runways, taxiways, gates, and other airport locations.

Returning to FIG. 1, in certain embodiments, housing 16 and housing 30 may be configured as substitutes for standard airport markers. In these embodiments, housing 16 and housing 30 may be fitted, for example, with one or more airport lighting fixtures 60. For example, airport lighting fixtures 60 may include a visible light source and a lens configured to emit a desired color of light. White lights may be included for marking runway borders, and blue lights can be used to mark taxiways. Red lights may mark restricted areas, and amber lights mark a cautionary area nearing the end of a runway. Lighting fixtures 60 may have the same size, appearance, and intensity as lights included on standard airport markers.

Housing 16 and housing 30 may also be configured to include mounting components for attaching to mounting points for standard airport markers. For example, a flange 62 having a standard bolt pattern and a diameter of twelve inches may be included on housing 16 and housing 30 for attaching housing 16 and housing 30 to the mounting points for standard airport markers. A pipe coupler may attach body 20 of housing 16 to flange 62. A similar pipe coupler may be included on housing 30. For supplying power to lighting fixtures 60 and to electronics associated with the ultraviolet radiation emission and detection components of emission unit 12 and detection unit 14, housing 16 and housing 30 may include a power coupling device configured to mate with a standard power connector supplied at each airport marker mounting point.

The power coupling device included in housing 30 may be configured to include a plug, for example, for mating with a constant current transformer associated with a standard airport runway lighting fixture. Certain embodiments of the presently disclosed ultraviolet monitoring system may be configured to obtain all required power for operation directly from a pre-existing power supply, such as the constant current transformer typically found in standard runway lighting fixtures.

Other embodiments, however, may include one or more additional power supply or connection components for obtaining power for operation. For example, in one embodiment, one or more additional transformers may be added to the standard airport lighting power supply configuration. The inclusion of additional power supplying transformers may enable operation of certain components, such as radiation source 22, sensor 48, transmitter 50, and/or any other electrical components included in monitoring system 10 during times when it may unnecessary (or undesirable) to operate other components, such as visible lights associated with lighting fixtures 60, for example. Additionally or alternatively, the power coupling device may include one or more uninterruptable power supplies and/or one or more batteries for supplying power to various components of monitoring system 10 during times when power from the power supply associated with the standard airport lighting fixture, for example, may be otherwise unavailable.

Airport fixtures are subjected to harsh environmental elements including weather, jet exhaust, etc. and must be rated to withstand certain temperature and wind speed extremes. The physical envelope of standard airport markers has been well tested and satisfies the rating criteria. Thus, in certain embodiments, housing 16 and housing 30 are configured to fit substantially within the envelope defined by a standard airport lighting marker.

Monitoring system 10 may be employed in any application where it may be desirable to detect the motion of one or more objects passing through a radiation beam. In one embodiment, monitoring system 10 may be used at an airport as a tracking system and/or a collision avoidance system. For example, standard airport markers can be replaced with a plurality of emission units 12 and detection units 14 such that radiation from a particular emission unit may be detected by a corresponding detection unit.

By setting up a network of emission unit/detection unit pairs throughout the airport, movements of airplanes and other vehicles within the airport may be monitored. For instance, as an airplane moves along a taxiway, it will disrupt the UV radiation supplied from one or more emission units. This disruption may be detected by the corresponding detection units. As each detection unit senses a disrupted radiation signal, it may transmit this information, along with its location or a unique identifier to a control center. The control center may monitor the movement of an airplane or other vehicle by monitoring which emission unit/detection unit pairs are reporting disrupted signals at a particular time. Not only can the location of an airplane or other vehicle be determined from this information, but the speed and direction of the airplane or vehicle may also be determined (e.g., by knowing the location, layout direction, and spacing of the emission unit/detection unit pairs). Once determined, this information can be displayed to an air traffic controller, pilot, computer system, etc. and used as part of either a manual or automated tracking and collision avoidance system.

As an alternative to airport applications, monitoring system 10 may also be used as part of a perimeter monitoring system. For example, pairs of emission units 12 and detection units 14, may be located at regular intervals around a perimeter, such as a fence line. When the radiation supplied to a detection unit by a corresponding emission unit is interrupted, a signal may be transmitted to a control station indicative of the interruption. To determine the location of the disruption, the transmitted signal may include the location and/or a unique identifier associated with the detection unit that sensed the disruption. The transmitted signal may also include data received via encrypted data pulses received from an ultraviolet LED source at an emission unit 12. This data may include, for example, location information associated with a emission unit along the perimeter.

Monitoring system 10 may be especially useful in environments that often suffer from low visibility due to fog, rain, smoke, etc. Radiation in the ultraviolet spectrum, especially within the solar blind region, propagates with relatively little absorption or scattering. Further, the radiation that is scattered tends to scatter substantially in the forward direction. Thus, a significant portion of the radiation emitted by an emission unit 12 becomes incident on a corresponding detection unit 14. As a result, and in view of the absence of solar radiation in the solar blind region, detection units 14 may experience high signal to noise ratios that increase the sensitivity and effectiveness of monitoring system 10, even in conditions of low visibility.

It will be apparent to those skilled in the art that various modifications and variations can be made in the disclosed ultraviolet monitoring systems and methods without departing from the scope of the disclosure. Other embodiments of the disclosed systems will be apparent to those skilled in the art from consideration of the specification and practice of the disclosure disclosed herein.

What is claimed is:

1. An ultraviolet radiation detection unit, comprising:
   a housing;
   a radiation inlet aperture located on the housing;
   a first filter positioned along an optical path extending from the radiation inlet aperture, the first filter having a primary passband with a center wavelength within the range of about 240 nm to about 280 nm and a secondary passband with a center wavelength greater than 300 nm;
   a second filter positioned along the optical path, the second filter having a primary passband with a center wavelength substantially the same as the center wavelength of the primary passband of the first filter and a secondary passband with a center wavelength different from the center wavelength of the secondary passband of the first filter;
   a lens disposed in the optical path; and
   a sensor configured to generate a signal indicative of at least one characteristic associated with radiation passing through the first and second filters.

2. The ultraviolet radiation detection unit of claim 1, wherein the center wavelength of the primary passband of both the first and second filters is within the range about 252 nm to about 255 nm.

3. The ultraviolet radiation detection unit of claim 1, wherein the center wavelength of the secondary passband of the first filter is at least 1.75 times greater than the center wavelength of the primary band of the first filter, and the center wavelength of the secondary passband of the second filter is at least 1.25 times greater than the center wavelength of the primary band of the second filter.

4. The ultraviolet radiation detection unit of claim 1, further including a transmitter configured to transmit a communication from the radiation detection unit based on the signal from the sensor.

5. The ultraviolet radiation detection unit of claim 4, wherein the communication is a radio frequency communication.

6. An ultraviolet monitoring system, comprising:
   an ultraviolet radiation emission unit, including:
      a housing;
      an aperture located on the housing;
      a radiation source configured to emit radiation having a wavelength within a range of about 240 nm and about 280 nm; and
      a radiation reflector disposed proximate to the radiation source and configured to direct the radiation emitted from the radiation source through the aperture in the housing of the emission unit; and
   an ultraviolet radiation detection unit, remotely located with respect to the ultraviolet radiation emission unit, including:
      a housing;
      a radiation inlet aperture located on the housing;
      at least one filter disposed in an optical path extending from the radiation inlet;
      a lens disposed in the optical path; and
      a sensor configured to generate a signal indicative of at least one characteristic associated with radiation passing through the at least one filter.

7. The ultraviolet monitoring system of claim 6, wherein the at least one filter includes:
   a first filter positioned along an optical path extending from the radiation inlet aperture, the first filter having a primary passband with a center wavelength within the range of about 240 nm to about 280 nm and a secondary passband with a center wavelength greater than 300 nm; and a second filter positioned along the optical path, the second filter having a primary passband with a center wavelength substantially the same as the center wavelength of the primary passband of the first filter and a secondary passband with a center wavelength different from the center wavelength of the secondary passband of the first filter.

8. The ultraviolet monitoring system of claim 7, wherein the center wavelength of the primary passband of both the first and second filters is within the range about 252 nm to about 255 nm.

9. The ultraviolet monitoring system of claim 7, wherein the center wavelength of the secondary passband of the first filter is at least 1.75 times greater than the center wavelength of the primary band of the first filter, and the center wavelength of the secondary passband of the second filter is at least 1.25 times greater than the center wavelength of the primary band of the second filter.

10. The ultraviolet monitoring system of claim 6, wherein the radiation source has a lighted length of less than about 0.5 inches and includes incandescent lamp, a mercury lamp, or a deuterium lamp.

11. The ultraviolet monitoring system of claim 10, wherein the lighted length of the radiation source is about 0.375 inches or less.

12. The ultraviolet monitoring system of claim 6, wherein the radiation source includes an ultraviolet light emitting diode.

13. The ultraviolet monitoring system of claim 12, wherein the radiation emitted from the radiation source includes encrypted data pulses.

14. The ultraviolet monitoring system of claim 13, wherein the ultraviolet radiation detection unit further includes a transmitter configured to transmit a radio frequency communication from the ultraviolet radiation detection unit based on the encrypted data pulses.

15. The ultraviolet monitoring system of claim 6, wherein the housing of the ultraviolet radiation emission unit includes:
    at least one airport lighting fixture attached to the housing of the ultraviolet radiation emission unit; and
    one or more mounting elements configured to secure the housing of the ultraviolet radiation emission unit to an attachment point for a standard airport lighting marker.

16. The ultraviolet monitoring system of claim 15, wherein the at least one airport lighting fixture is configured to emit white, blue, amber, or red light.

17. The ultraviolet monitoring system of claim 6, wherein the housing of the ultraviolet radiation detection unit includes:
    at least one airport lighting fixture attached to the housing of the ultraviolet radiation detection unit; and
    one or more mounting elements configured to secure the housing of the ultraviolet radiation detection unit to an attachment point for a standard airport lighting marker.

18. The ultraviolet monitoring system of claim 6, wherein the ultraviolet radiation detection unit further includes a transmitter configured to transmit a radio frequency communication from the ultraviolet radiation detection unit based on the signal from the sensor.

19. The ultraviolet monitoring system of claim 6, wherein the radiation source is configured to emit radiation having a wavelength within a range of about 252 nm to about 255 nm.

20. The ultraviolet monitoring system of claim 6, wherein the ultraviolet radiation emission unit includes a power coupling for receiving power from a power supply for a standard airport lighting marker.

21. The ultraviolet monitoring system of claim 6, wherein the housing of the ultraviolet radiation emission unit and the housing of the ultraviolet radiation detection unit are each configured to fit substantially within an envelope defined by a standard airport lighting marker.

22. The ultraviolet monitoring system of claim 6, further including a quartz window disposed over the aperture located on the housing of the ultraviolet radiation emission unit such that radiation emitted from the radiation source exits the aperture through the quartz window.

* * * * *